US006929269B2

(12) United States Patent
Oliver

(10) Patent No.: US 6,929,269 B2
(45) Date of Patent: Aug. 16, 2005

(54) TRANSPORTABLE SADDLE RACK AND EQUIPMENT CARRIER

(76) Inventor: Edward J. Oliver, 13728 404th Ave., Groton, SD (US) 57445

(*) Notice: Subject to any disclaimer, the term of this patent is extended or adjusted under 35 U.S.C. 154(b) by 0 days.

(21) Appl. No.: 10/639,404

(22) Filed: Aug. 12, 2003

(65) Prior Publication Data

US 2004/0032101 A1 Feb. 19, 2004

Related U.S. Application Data

(62) Division of application No. 09/877,339, filed on Jun. 8, 2001, now Pat. No. 6,616,152.

(51) Int. Cl.⁷ .................................. B62B 1/12
(52) U.S. Cl. .................. 280/47.18; 280/47.19; 280/47.28; 280/47.29; 280/35; D34/24
(58) Field of Search ................. 280/47.24, 35, 280/47.18, 47.19, 47.23, 47.27, 47.28, 47.29, 47.2, 47.35; 211/2, 87, 85.11, 13, 86, 104; D34/24

(56) References Cited

U.S. PATENT DOCUMENTS

| | | | | |
|---|---|---|---|---|
| 2,740,532 A | * | 4/1956 | Kleinsmith ................. 211/104 |
| 2,952,366 A | * | 9/1960 | Botten ........................ 211/104 |
| 3,233,745 A | * | 2/1966 | Hershberger ................ 211/104 |
| 3,780,971 A | * | 12/1973 | De Filipps ............... 248/309.1 |
| 3,861,695 A | * | 1/1975 | Shourek et al. ............ 280/5.24 |
| 3,930,663 A | * | 1/1976 | Scripter ...................... 280/654 |
| D255,611 S | * | 6/1980 | Love ......................... D30/143 |
| 4,250,770 A | * | 2/1981 | Robertson, Jr. ............ 74/551.8 |
| 4,356,922 A | * | 11/1982 | Dierksheide ............. 211/85.11 |
| D316,919 S |  | 5/1991 | Reep |
| 5,101,985 A | * | 4/1992 | Pasban-Dowlatshahi . 211/85.11 |
| 5,165,553 A |  | 11/1992 | Benson |
| 5,259,521 A | * | 11/1993 | Shaffer et al. ............. 211/199 |
| D343,031 S |  | 1/1994 | McElhaney |
| 5,338,049 A |  | 8/1994 | Goring |
| 5,362,078 A | * | 11/1994 | Paton ...................... 280/47.18 |
| 5,474,312 A | * | 12/1995 | Starita et al. ............ 280/47.19 |
| 5,487,497 A | * | 1/1996 | Kwiatkowski .............. 224/420 |
| 5,577,745 A | * | 11/1996 | Birk ........................ 280/47.19 |
| 5,579,968 A | * | 12/1996 | Staschiak ................... 224/274 |
| D377,548 S |  | 1/1997 | O'Shea |
| 5,590,795 A | * | 1/1997 | Wright ...................... 211/104 |
| 5,615,783 A | * | 4/1997 | Warnken .................... 211/118 |
| 5,791,668 A | * | 8/1998 | Lenardson ............... 280/47.33 |
| 6,189,706 B1 | * | 2/2001 | Akins ...................... 211/87.01 |
| 6,511,138 B1 | * | 1/2003 | Gardner et al. ............ 312/217 |
| 6,616,152 B2 | * | 9/2003 | Oliver ..................... 280/47.18 |
| 6,659,476 B2 | * | 12/2003 | Weida ...................... 280/47.19 |

* cited by examiner

Primary Examiner—J. Allen Shriver
(74) Attorney, Agent, or Firm—Kinney & Lange, P.A.

(57) ABSTRACT

A saddle rack for transporting one or more saddles includes a vertical frame attached to a base frame, where the base frame has an expandable portion that telescopes out from the vertical frame. Saddle arms for supporting saddles are pivotally connected to the front of the vertical frame allowing them to swing into horizontal position and then fold down into a vertical position. Also attached to the vertical frame is a strut that is also pivotally connected to the front face of the vertical frame. The strut swings up to support the saddle arm when it is in the horizontal position. The saddle rack also includes a locking mechanism for attaching the saddle rack to a standard dolly. The use of the saddle rack in combination with the dolly allows for easy transport of the saddle rack. The saddle rack also has portions for carrying additional accessories needed for use of equestrians including a tack holder, a basket and a muck bucket clip.

14 Claims, 9 Drawing Sheets

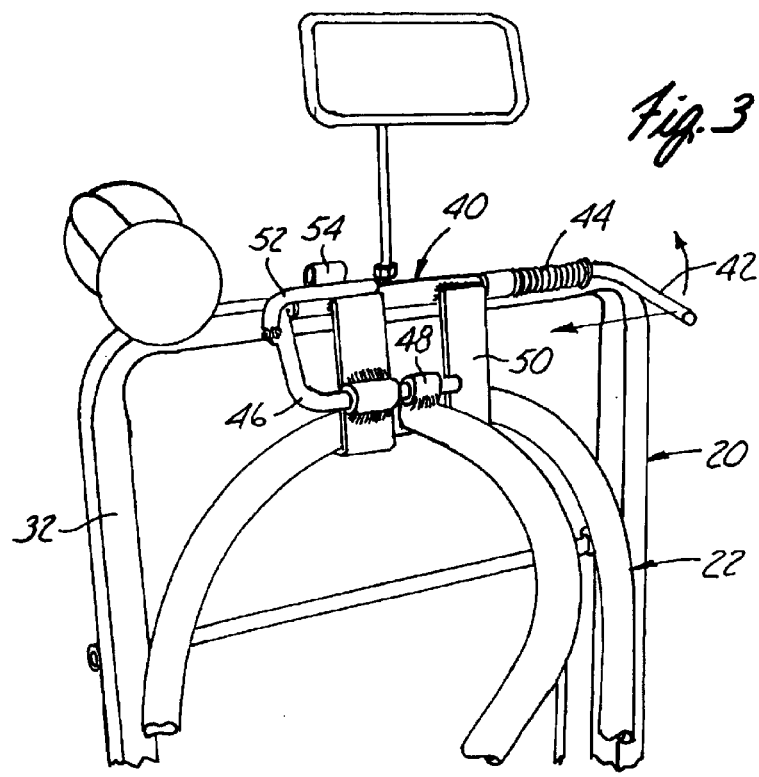
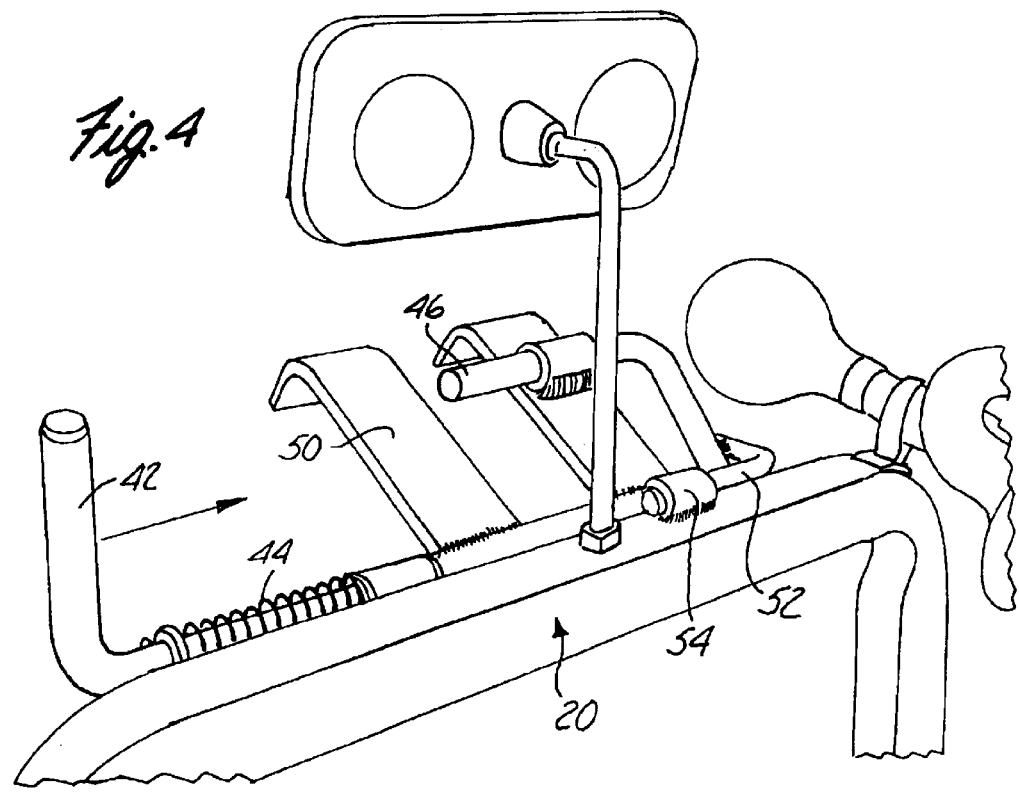

TRANSPORTABLE SADDLE RACK AND EQUIPMENT CARRIER

CROSS-REFERENCE TO RELATED APPLICATION(S)

This application is a division of U.S. application Ser. No. 09/877,339 filed Jun. 8, 2001 now U.S. Pat. No. 6,616,152 entitled "Transportable Saddle Rack and Equipment Carrier" by Edward J. Oliver.

BACKGROUND OF THE INVENTION

This invention relates to devices for transporting and storing equestrian equipment; primarily saddles, bridles and related tack items. More particularly, the invention relates to a combination of a storage frame for carrying saddles with a standard dolly to allow for easy transportation, not only in a stable setting, but also when transporting horses and their equipment to shows and riding events. The saddle rack may be separated from the dolly to work as a stationary storage frame. The saddle rack has folding arms to carry two saddles, as well as an expanding bottom frame for transportation of a muck bucket or other large items such as a bale of hay.

Equestrian saddles are expensive articles which require significant care during transportation and storage. They may also be quite heavy, varying between approximately 35 pounds and possibly up to 200 pounds for very ornate decorative saddles. The weight in combination with bulky size and hanging stirrups and straps makes the saddles quite cumbersome for a person to carry. Also saddles are usually made of a combination of leather and wood, both of which are pliable materials that have a tendency to mold the shape of the support. If the saddle is unsupported or improperly supported by being laid on a flat surface for a lengthy amount of time, the saddle becomes deformed and unsuitable for placing on a horse's back. Additionally, there are pads on the underside of the saddle that are specifically for cushioning the horse's back to ensure that the weight of the saddle and rider rest properly on the muscle pads on either side of the horse's spine. The cushion panels require periodic care and maintenance so that they remain smooth in their shape and retain their shape in order to conform to the horse's back and prevent injury. Therefore it is important that the saddle is transported and stored properly to prevent damage to these panels and therefore later resulting in harm to the horse.

Additionally, saddles also have rigging attached including stirrups and various straps that hang below and/or over the saddle. Therefore any structure for storing or transporting a saddle must accommodate this additional rigging. Saddles can be very difficult to transport due to the saddle shape which must be maintained in a U generally resembling the horse's back to prevent damage to the saddle and the ability to handle the long stirrups and straps. In addition as mentioned previously saddles are heavy. Therefore, having an easy and convenient way to transport the saddles without damage is important.

While other saddle racks are known in the art, they often are capable of only carrying one saddle and are either for short term short distance transportation say around the home horse barn or stable and are often very limited in their storage of other items. [U.S. Pat. Nos. 5,338,049; 3,930,663; 5,791,668] Other types of saddle racks are very large and cumbersome, requiring special transport devices and additional separate supports to supply the needed storage and saddle support during actual transportation. [U.S. Pat. No. 5,362,078]

Combination saddle racks and carriers are known in the art. For example, U.S. Pat. No. 5,362,078 shows a combination stationary rack and transportation unit. However, the dolly used is a highly specialized one built specifically for transporting the described inventive rack. The rack described is not adaptable to using a standard dolly. Also, the rack requires additional stabilization to prevent the saddle supports from bouncing during transportation and would have difficulty accommodating additional equipment such as a muck bucket or a bale of hay.

BRIEF SUMMARY OF THE INVENTION

The present invention is a saddle rack that can be easily transported by a standard dolly. When coupled, the rack and dolly act as one unit which is capable of transporting one or two saddles as well as various other pieces of equestrian equipment. The saddle rack is also useful as an independent saddle storage device with foldable saddle arms that operate to receive saddles for transportation and storage while maintaining the integrity of the saddle.

The present invention addresses the needs of transporting one or two saddles on a conveniently separated storage rack. The inventive device is characterized by dual functionality of both a rack that can easily be transported by a standard dolly, as well as having convenient folding features to reduce the size of the rack when it is not needed for operation. The rack carrier combination is also capable of being used to transport other large articles such as a muck bucket or a large bale of hay as well as additional features for the storage of other items.

The invention has the additional benefit of having conveniently folding attached saddle arms that allow for easy reduction of the size of the rack when not in use.

BRIEF DESCRIPTION OF THE DRAWINGS

FIG. 3 is a perspective view of a locking mechanism of the saddle rack and dolly.

FIG. 4 is an enlarged view of the locking mechanism of FIG. 3 in an open position.

FIG. 6A is a sectional view along section 6A—6A of FIG. 6.

DETAILED DESCRIPTION

Figure 1:
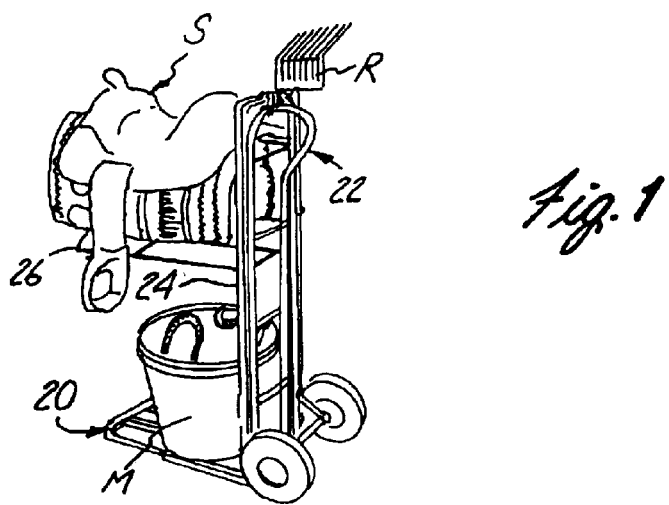
FIG. 1 is a perspective view of a saddle rack attached to a dolly.

A saddle rack of the invention is shown in FIG. 1 and is generally referred to as 20. Rack 20 is shown in combination with dolly 22. A feature of the invention is the attachment of dolly 22 to rack 20 for transportation as shown in FIG. 1. Rack 20 includes frame 24 for supporting saddle arms 26, one of which is shown carrying a saddles. Frame 24 can also support other features such as a muck bucket M and other accessories such as the rake R.

Figure 2:
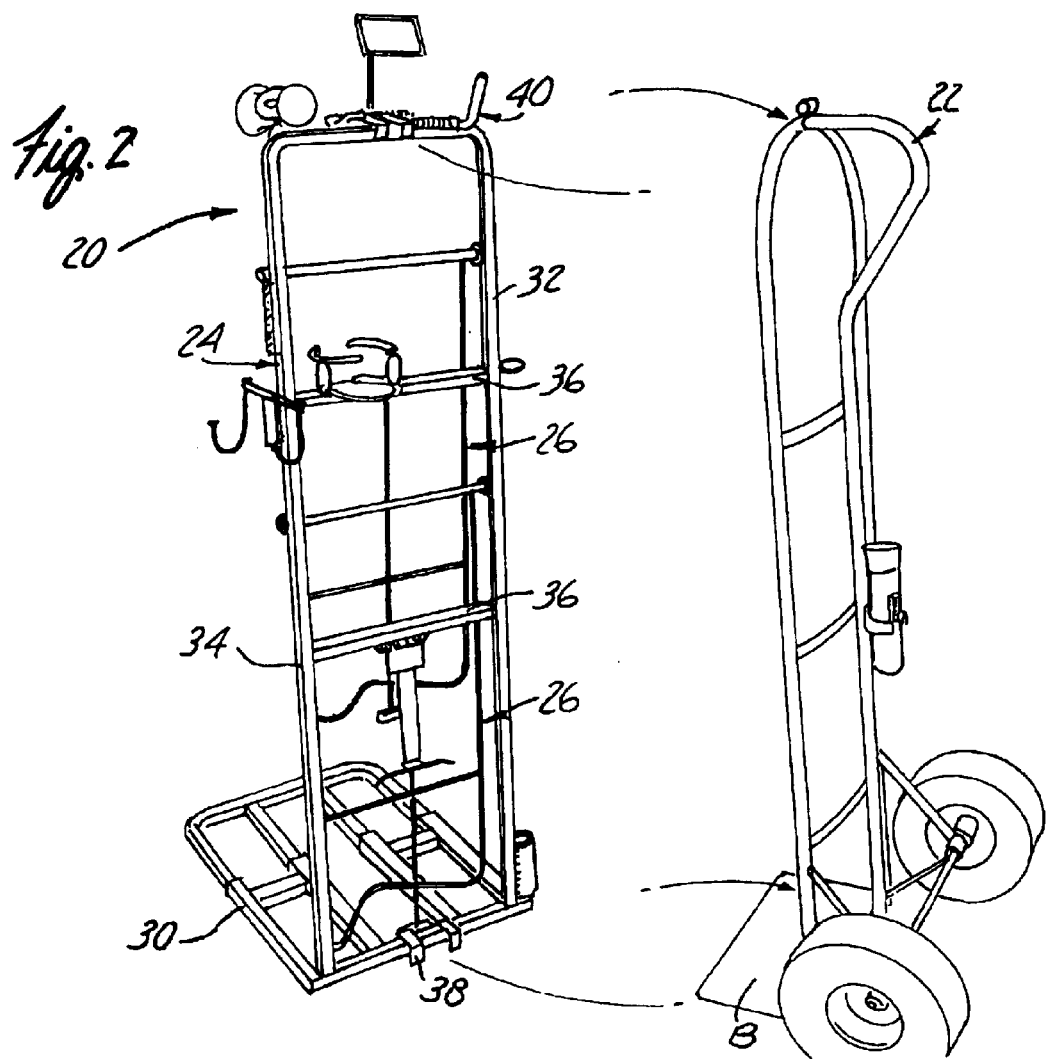
FIG. 2 is a perspective view of the saddle rack separate from the dolly.

In FIG. 2, dolly 22 is shown separated from saddle rack 20. Frame 24 of saddle rack 20 includes base frame 30 attached to a lower end of vertical frame 32. Saddle arms 26 are shown in a folded down position, parallel to vertical frame 32. Vertical frame 32 is formed by invented U member 34 and cross pieces 36.

Attachment of the saddle rack 20 to dolly 22 is provided by fingers 38 on base 30 and locking mechanism 40 at the upper end of vertical frame 32. Saddle rack 20 slides onto dolly 22, and fingers 38 grasp the base plate B of dolly 22. Locking mechanism 40 attaches to end of dolly 22 securing saddle rack 20 to dolly 22.

Locking mechanism 40 is shown in more detail in FIG. 3. Locking mechanism 40 includes handle 42, spring 44, pin 46, collar 48 (on dolly 22), fingers 50, pin 52, and collar 54 (on vertical frame 32). Handle 42, operates pin 46 that passes through collar 48. Handle 42 also operates pin 52 which passes through collar 54. The action of the locking mechanism 40 is laterally biased by spring 44. Handle 42 is operable for both lateral and rotational movement. Locking mechanism 40 is shown in FIG. 3 in position securing frame 20 to dolly 22. Two fingers 50 hook the upper portion of dolly 22. Pin 46 is engaged through collar 48.

To release locking mechanism 40, handle 42 is laterally moved inward, releasing pin 46 from collar 48. Then handle 42 is rotated upward, lifting fingers 50 away from the dolly 22 as shown in FIG. 4. To secure locking mechanism 40 in an open position, pin 54 is inserted into collar 54 attached to frame 20.

Figure 5:
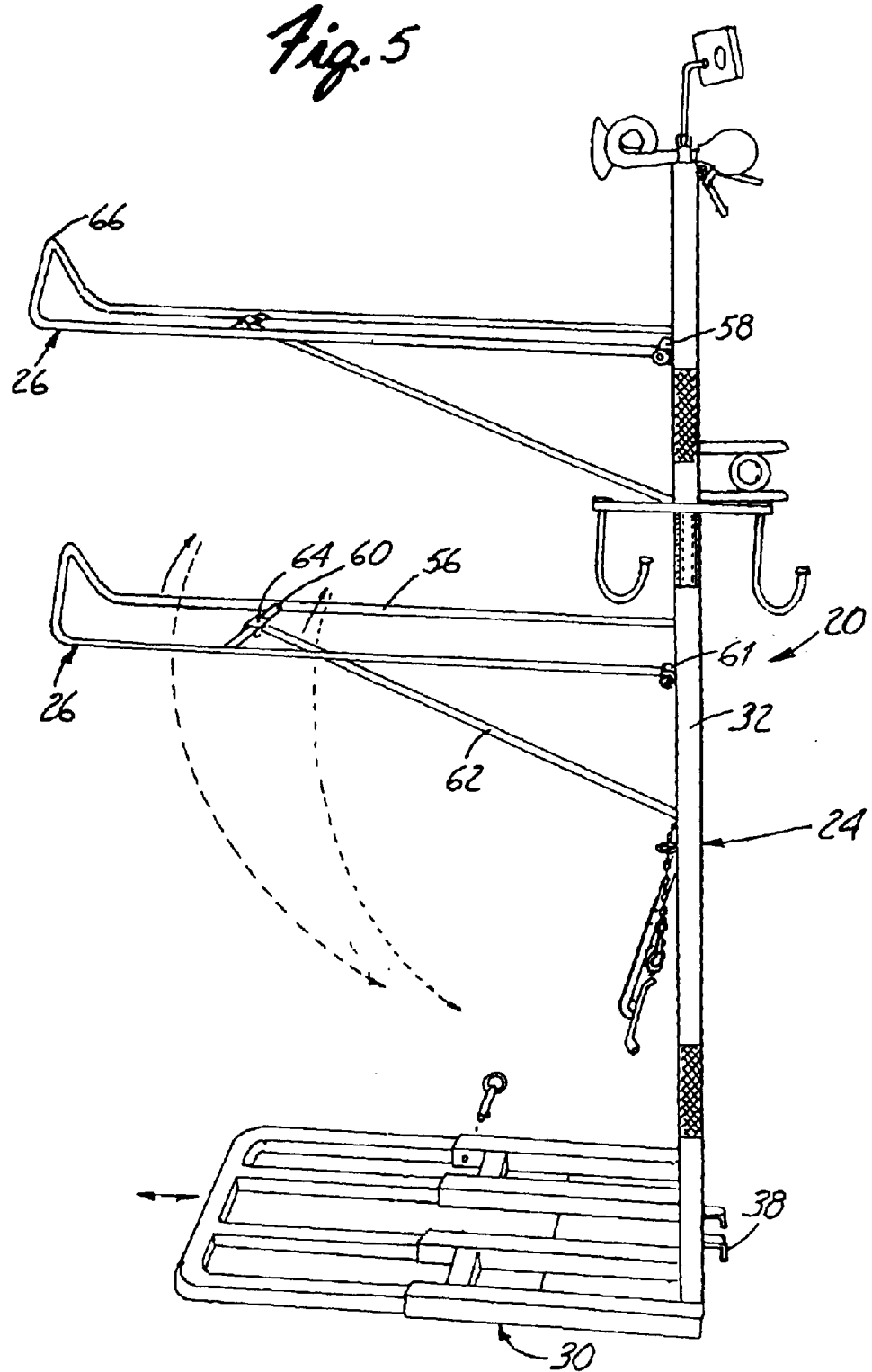
FIG. 5 is a side perspective of the saddle rack.
Figure 6:
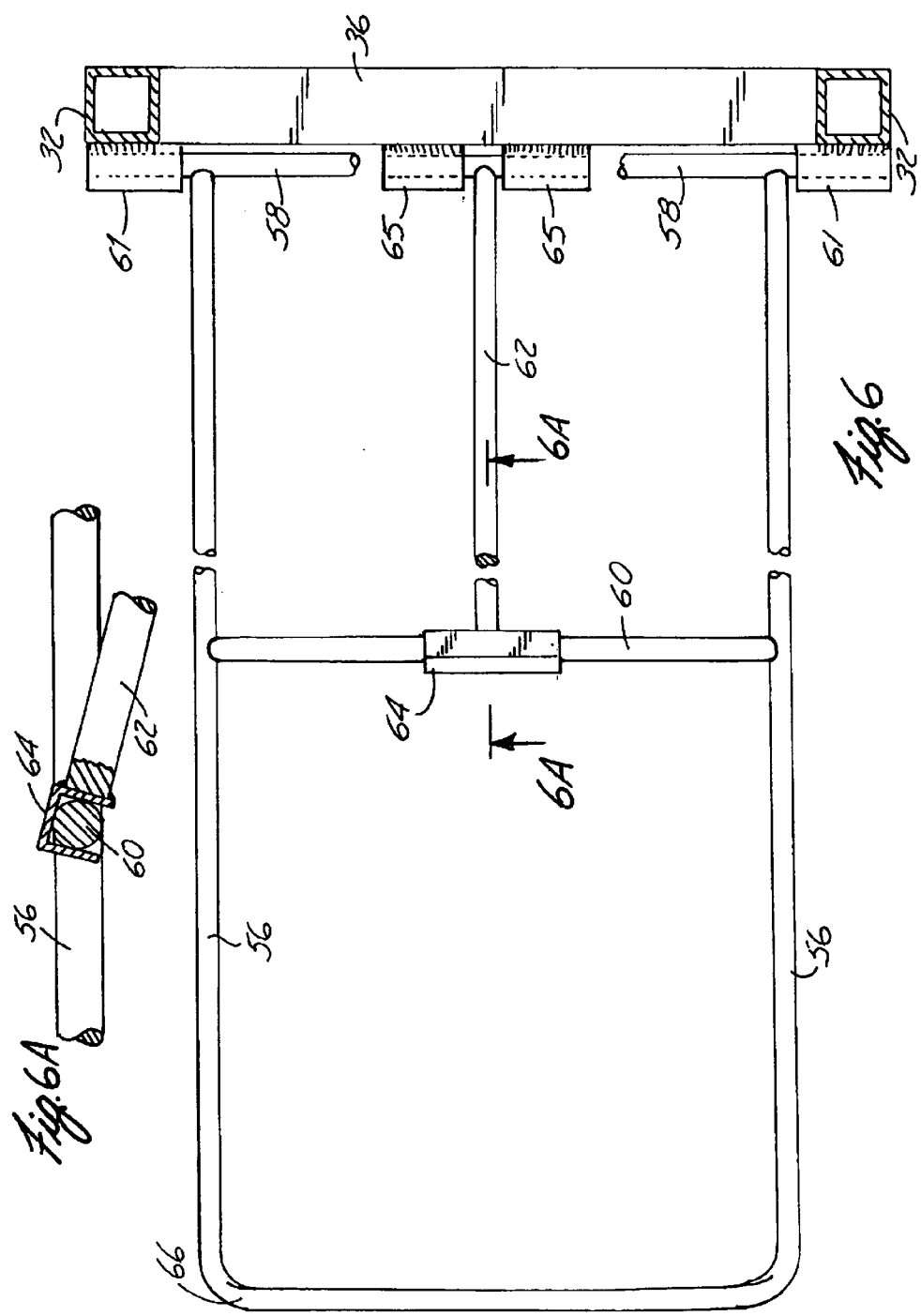
FIG. 6 is a top view showing a saddle arm and strut.

Folding saddle arms 26 are shown in more detail in FIGS. 5 and 6. Each saddle arm 26 includes U-shaped arm 56, rear shaft 58 and center cross bar 60. Arm 56 is connected to shaft 58, which is rotatably connected to vertical frame 32 at sleeves 61. Cross bar 60 is attached preferably across U-shaped arm 56.

Each saddle arm 26 is held in a horizontal position by strut 62. At its proximal end, strut 62 is rotatably connected to the vertical frame portion 32 by sleeves 65. Clip 64 at the distal end of strut 62 connects strut 62 to cross bar 60. (See FIG. 6A)

In FIGS. 5 and 6, saddle arms 26 are shown in the horizontal position for carrying saddles. The U-shaped arm 56 supports a saddle and preferably includes upward curved portion 66 at its distal end to prevent the saddle from sliding off during transportation. Saddle arms 26 fold from a horizontal position to a vertical position when they are not in use. To fold arms 26 downward, strut 62 is moved upward, so that clip 64 disengages cross bar 60. This allows U-shaped arm 56 to rotate downward into a vertical position parallel to vertical frame portion 32. Then strut 62 also rotates downward into a vertical position parallel to vertical frame portion.

Figure 7:
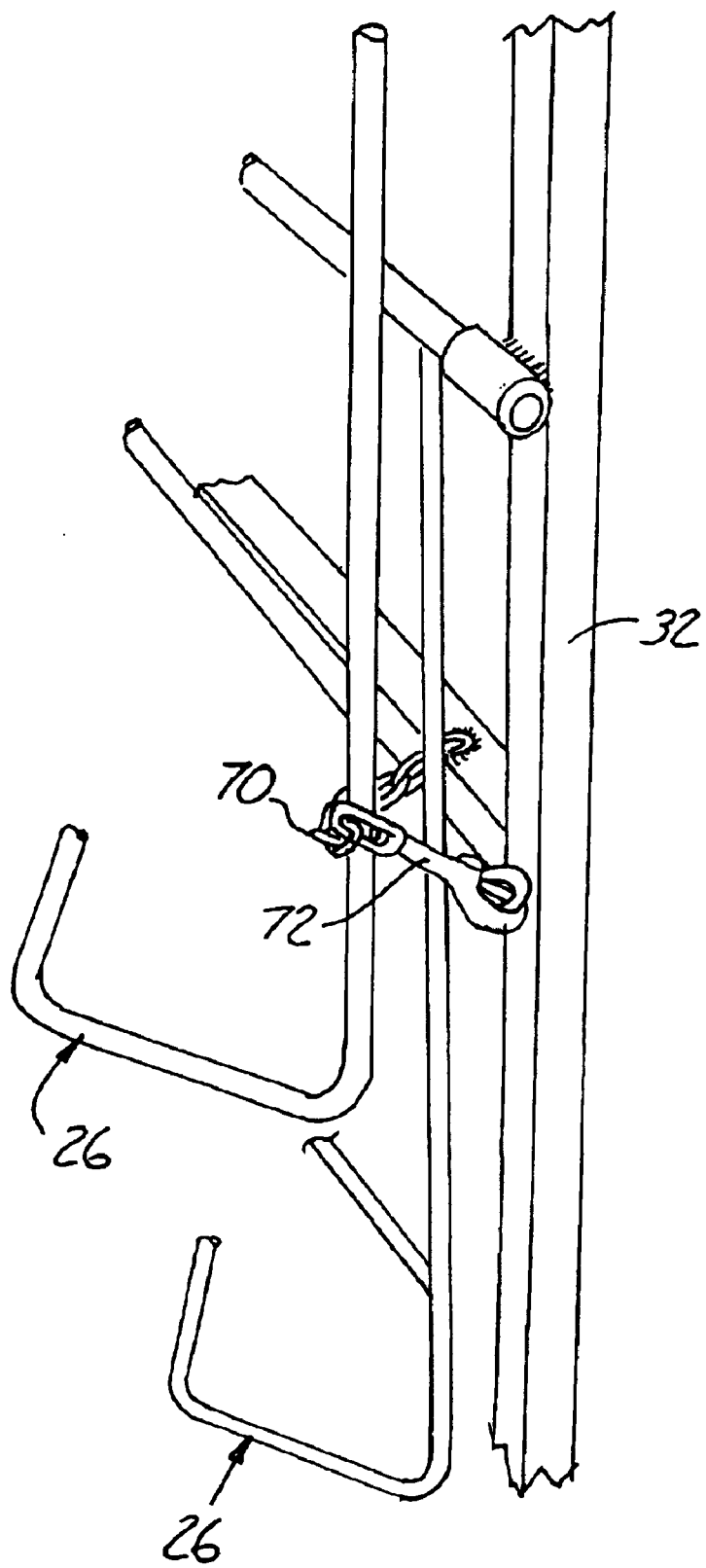
FIG. 7 is a fragmentary detail showing saddle arms locked to a saddle rack in a folded down position.

The saddle arms 26 may be secured in the vertical position by a retention chain 70 and clip 72 attached to the vertical frame portion 32 as shown in FIG.7.

Figure 8:
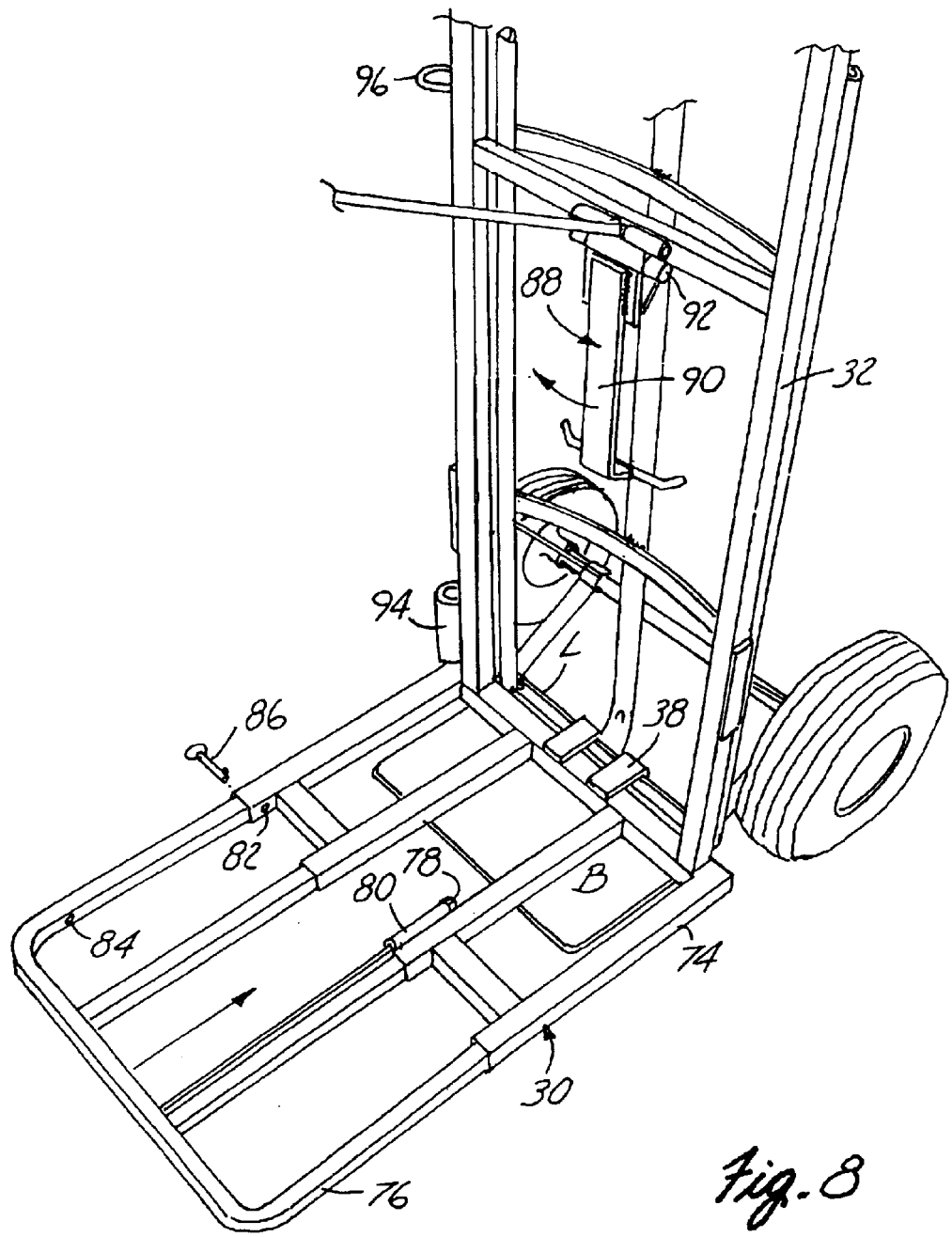
FIG. 8 is a perspective view of saddle rack attached to dolly.

Another feature of saddle rack 20 is telescoping base frame 30. The base frame 30 includes of proximal portion 74, distal portion 76, stop 78, lynch pin 86 and holes 82 and 84. Proximal portion 74 is attached to vertical frame portion 32 and has fingers 38 for attachment to an upstanding lip L of bottom plate B of dolly 22, as shown in FIG. 8. Distal portion 76 nests inside of proximal portion 74 and telescopes outward to a fully extended position as shown in FIG. 8. When distal portion 76 is fully extended, stop 78 hits collar 80 to prevent distal portion 76 from disengaging proximal portion 74. Distal portion 76 is secured in the extended position by lynch pin 86 being inserted, through hole 82 in both the distal portion 76 and the proximal portion 74.

To retract the distal portion 76 into the proximal portion 74, lynch pin 86 is removed from hole 82, allowing movement of the distal portion towards the proximal portion 74. When distal portion 76 is fully inserted hole 84 in the distal portion aligns with hole 82 in the proximal portion allowing the securing of the distal portion in the retracted or nested position by the insertion of the lynch pin 86 into holes 84 and 82.

Another feature of saddle rack 20 is attached collars 94 and 96 for preferably holding a rake or broom. Shown in FIG. 8, lower collar 94 and upper collar 96 are vertically aligned on a side face of vertical frame portion 32. Upper collar 96 is hollow allowing the handle of a rake to pass through down to lower collar 94, which has a bottom to hold the end of a handle. Rake R carried by the collars can be seen in FIG. 1.

Figure 9:
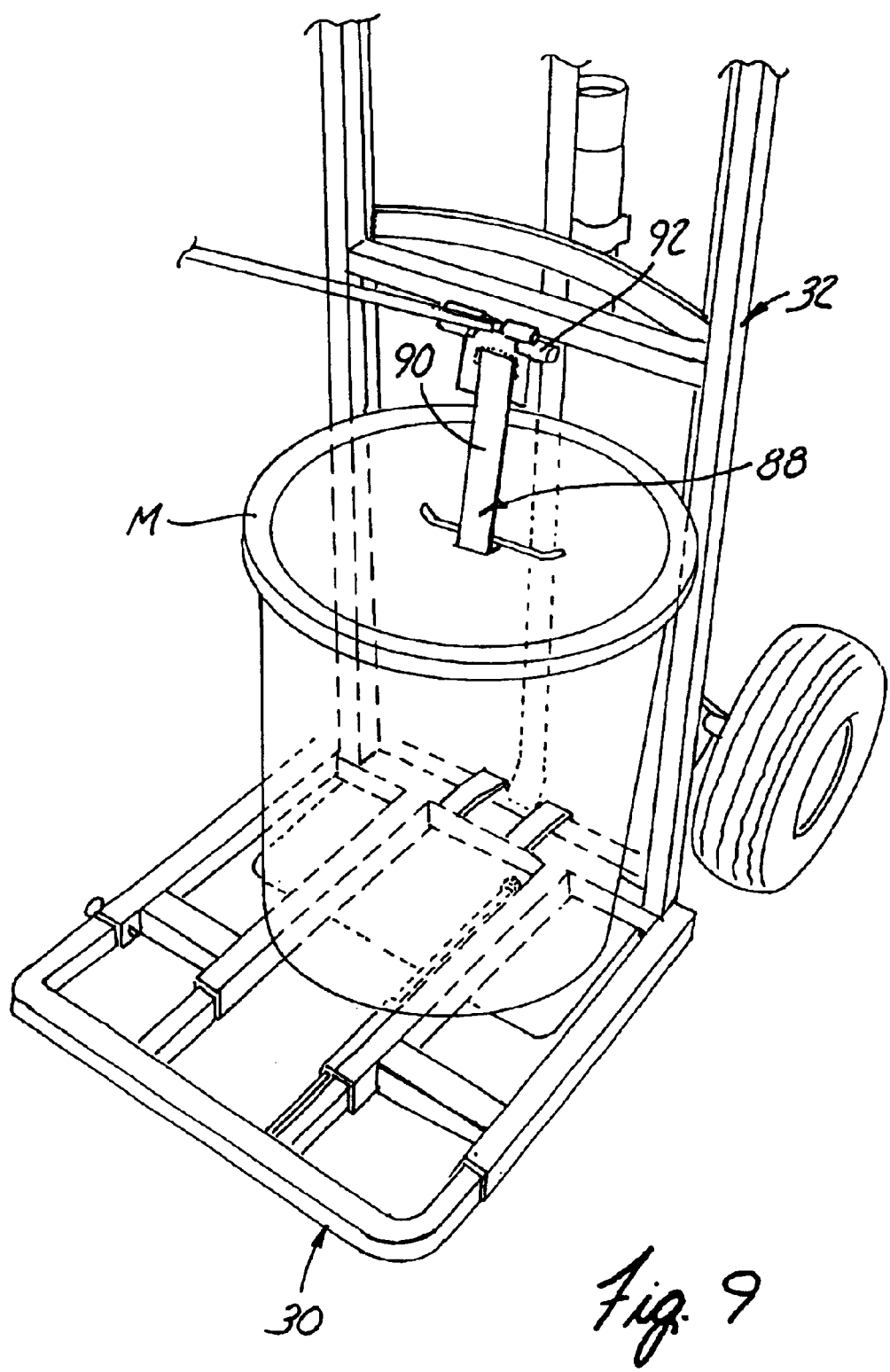
FIG. 9 is a perspective view of a saddle rack carrying a muck bucket.

Another feature of saddle rack 20 is muck bucket clip 88 attached to the vertical frame portion 32 as shown in FIG. 9. Muck bucket clip 88 is comprised of lever arm 90 and spring-biased hinge 92. The spring-biased hinge 92 allows the lever arm 90 to rotate from a vertical position to a horizontal position in order to position a large bucket on base frame 30. The spring-bias of hinge 92 forces lever arm 90 to return to a vertical position, thereby clamping the bucket M to the vertical frame portion 32 as seen in FIG. 9.

Figure 10:
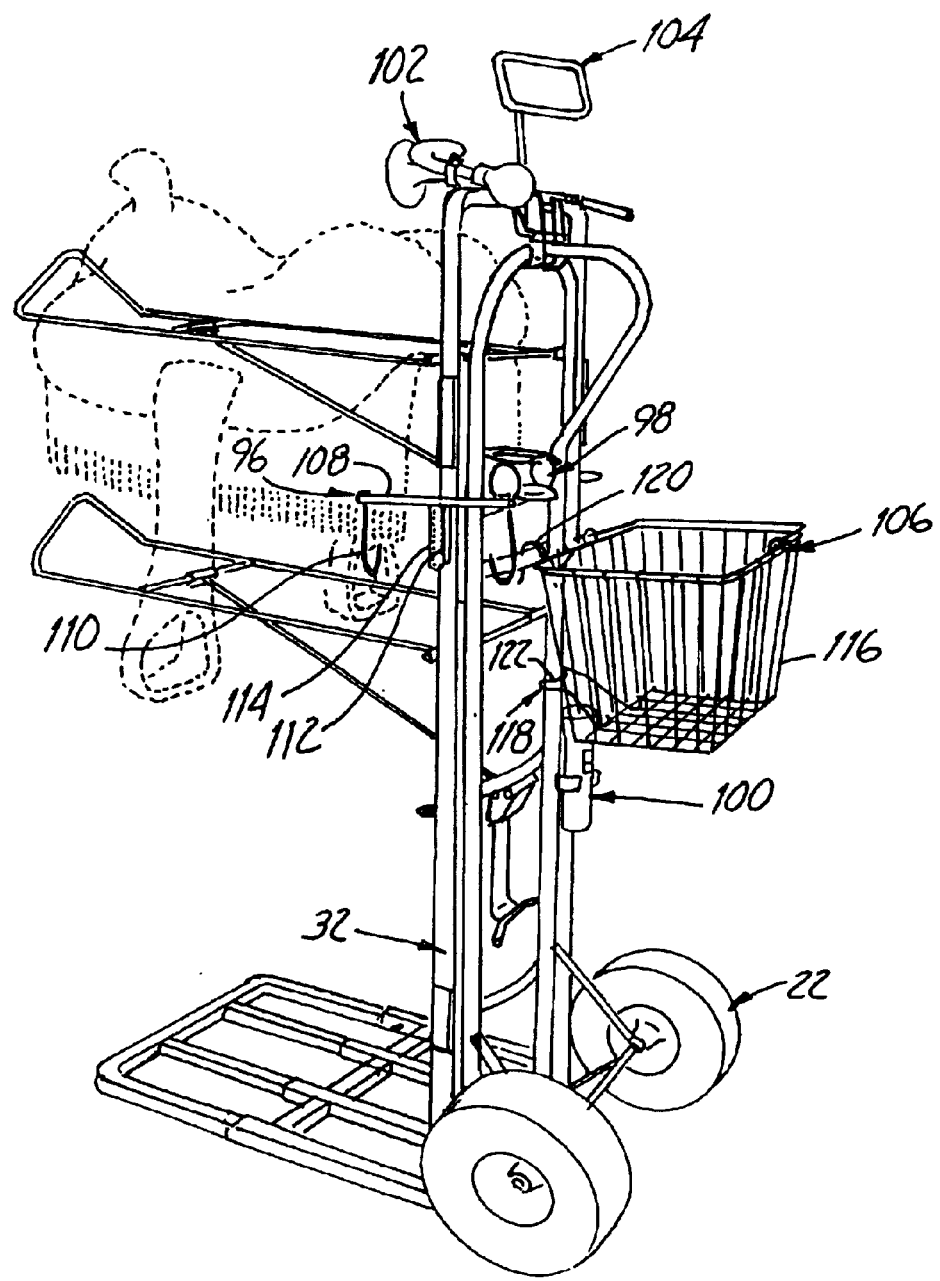
FIG. 10 is a perspective view of a saddle rack attached to a dolly.

Additional features include a bridle or tack holder 96, cup holder 98, flashlight clip 100, horn 102, mirror 104 and basket assembly 106 as shown in FIG. 10. Tack holder 96 is comprised of a support bar 108, hooks 110 and pin 112. Hooks 110 (preferably two) are attached to the support bar 108 for supporting the bridle or tack. Pin 112 is attached to support bar 108. Pin 112 is received into collar 114 attached to the side of vertical frame portion 32.

Basket assembly 106 is supported by dolly 22 and does not require frame 20 to be mounted on dolly 22. Basket assembly 106 includes basket 116 held by bracket 118. Bracket 118 is formed by support member 122 with two upper hooks 120 and two lower hooks 124. Support member 122 rests against a central support of dolly 22 while hooks 120 attach to a cross-piece of dolly 22.

Figure 11:
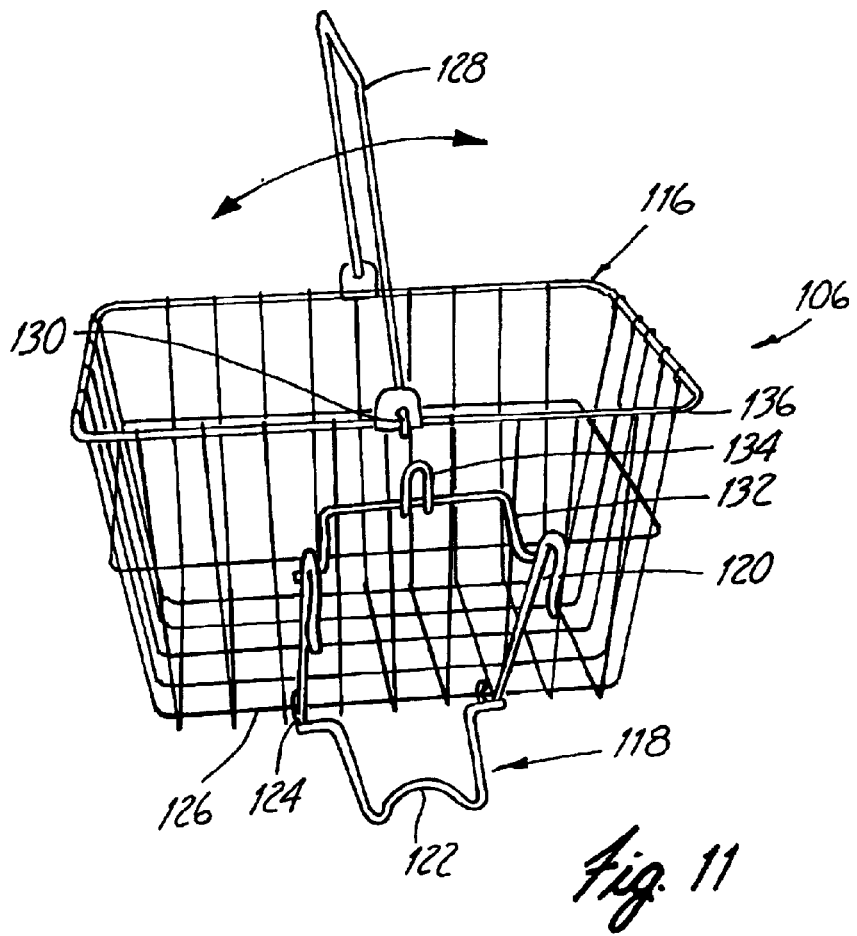
FIG. 11 is a perspective view of a basket assembly.

Basket assembly 106 is seen separated from the dolly in FIG. 11. Support member 122 is preferably curved to stabilize bracket 118 to reduce lateral movement of the basket assembly 106. Support member 122 is preferably bent towards dolly 22 to allow bracket 118 to carry basket 116 in an upright position. Bracket 118 also preferably has two lower hooks 124 attached to upper hooks 120. Lower hooks 124 support lower edge 126 of basket 116. Basket 116 is preferably a wire frame or mesh basket. Possible alternative embodiments include a solid frame basket with openings to accommodate lower hooks 124.

In the preferred embodiment, handle 128 is pivotally mounted on basket 116. One end of handle 128 forms additional finger 130.

Bracket 118 also includes loop 134 and bridge 132. Bridge 132 is attached between the upper hooks 120 and supports loop 134. Loop 134 captures finger 130, securing upper portion 136 of basket 108 to bracket 118. In the preferred embodiment, finger 130 is parallel to handle 128.

Figure 12:
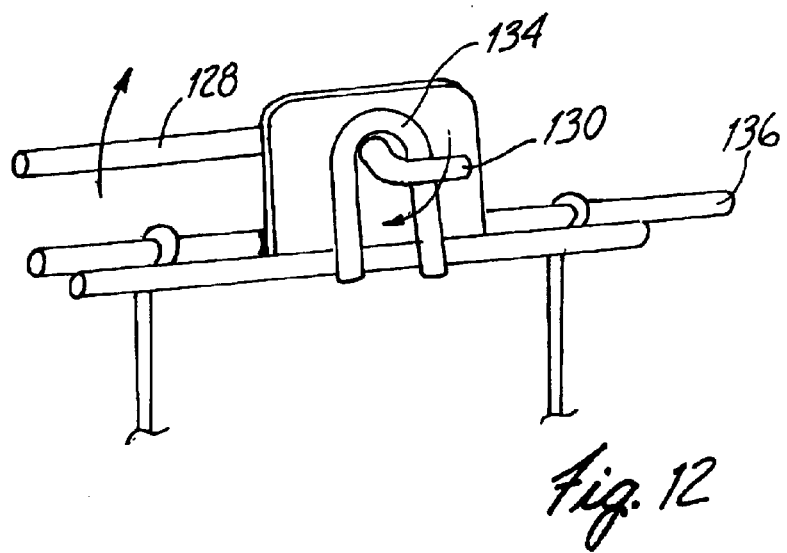
FIG. 12 is a fragmentary detail showing the connection of the basket assembly.

To secure basket 116 to bracket 118, lower edge 126 is engaged in lower hooks 124. Then handle 128 is positioned vertical relative to basket 116, allowing finger 130 to be inserted through loop 134. While finger 130 is maintained through loop 134, handle 128 is rotated to a horizontal position, likewise rotating finger 130 to a horizontal position trapping finger 130 on the opposite side of loop 134 from the basket 116. This secures upper portion 136 of basket 116 to bracket 118 as seen in FIG. 12.

Basket 116 is released by rotating handle 128 from a horizontal position to a vertical position, thereby allowing finger 130 to pass through loop 134, which releases upper portion 136 of basket 116. Then basket 116 may be lifted from lower hooks 124, thereby separating basket 116 from bracket 118.

Although the present invention has been described with reference to preferred embodiments, workers skilled in the art will recognize that changes may be made in form and detail without departing from the spirit and scope of the invention.

What is claimed is:

1. A saddle rack comprising:
   a vertical frame;
   a base frame connected to the vertical frame;
   an upper saddle arm pivotally connected to the vertical frame for movement between a generally vertical storage position and a generally horizontal saddle support position;
   an upper strut pivotally connected to the vertical frame for movement between a generally vertical storage position and an upper saddle arm supporting position;
   a lower saddle arm pivotally connected to the vertical frame for movement between a generally vertical storage position and a generally horizontal saddle support position, wherein the lower saddle arm is positioned between the upper saddle arm and the vertical frame when the lower saddle arm and the upper saddle arm are in the generally vertical storage position; and
   a lower strut pivotally connected to the vertical frame for movement between a generally vertical storage position and a lower saddle arm supporting position.

2. The saddle rack of claim 1 wherein the base frame includes a forward portion telescopically coupled to a rearward portion.

3. The saddle rack of claim 1 further comprising a cup holder attached to a cross-piece portion of the vertical frame.

4. The saddle rack of claim 1 further comprising a mirror attached to the vertical frame.

5. The saddle rack of claim 1 further comprising a horn attached to the vertical frame.

6. The saddle rack of claim 1 further comprising a muck bucket clip which includes:
   an arm rotatably coupled to the vertical frame, and
   wherein the arm is spring-biased towards the vertical frame.

7. The saddle rack of claim 1 further comprising a cross bar on the upper saddle arm to connect with the upper strut and a cross bar on the lower saddle arm to connect with the lower strut.

8. The saddle rack of claim 1 further comprising a first locking mechanism to secure the upper strut to a cross bar of the upper saddle arm and a second locking mechanism to secure the lower strut to a cross bar of the lower saddle arm.

9. The saddle rack of claim 1 further comprising a securing device for securing the saddle arm to the vertical frame when the arm is in a vertical position.

10. The saddle rack of claim 9 wherein the securing device comprises a retention chain and clip.

11. The saddle rack of claim 1 wherein the upper saddle arm is pivotally connected to the vertical frame to pivot about a first horizontal axis and the upper strut is pivotally connected to the vertical frame to pivot about a second horizontal axis, and the first horizontal axis is vertically higher than the second horizontal axis.

12. The saddle rack of claim 1 wherein the lower saddle arm is pivotally connected to the vertical frame to pivot about a third horizontal axis and the lower strut is pivotally connected to the vertical frame to pivot about a fourth horizontal axis, and the third horizontal axis is vertically higher than the fourth horizontal axis, but vertically lower than the second horizontal axis.

13. A saddle rack comprising:
   a vertical frame;
   a base frame connected to the vertical frame;
   a saddle arm pivotally connected to the vertical frame for movement between a generally vertical storage position and a generally horizontal saddle support position;
   a strut pivotally connected to the vertical frame for movement between a generally vertical storage position and a saddle arm support position; and
   a sleeve attached to the vertical frame, wherein the sleeve receives a pin attached to a bracket coupled to hooks.

14. A saddle rack comprising:
   a vertical frame;
   a base frame connected to the vertical frame;
   an upper saddle arm pivotally connected to the vertical frame for movement between a generally vertical storage position and a generally horizontal saddle support position;
   an upper strut pivotally connected to the vertical frame for movement between a generally vertical storage position and an upper saddle arm supporting position;
   a lower saddle arm pivotally connected to the vertical frame for movement between a generally vertical storage position and a generally horizontal saddle support position;
   a lower strut pivotally connected to the vertical frame for movement between a generally vertical storage position and a lower saddle arm supporting position; and
   a sleeve attached to the vertical frame, wherein the sleeve receives a pin attached to a bracket coupled to hooks.

* * * * *